(12) United States Patent
Forcht et al.

(10) Patent No.: US 11,561,381 B2
(45) Date of Patent: Jan. 24, 2023

(54) CATADIOPTRIC LENS AND OPTICAL SYSTEM COMPRISING SUCH A LENS

(71) Applicant: Carl Zeiss SMT GmbH, Oberkochen (DE)

(72) Inventors: Konstantin Forcht, Aalen (DE); Dirk Doering, Erfurt-Hochheim (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 525 days.

(21) Appl. No.: 16/544,135

(22) Filed: Aug. 19, 2019

(65) Prior Publication Data

US 2019/0369374 A1 Dec. 5, 2019

Related U.S. Application Data

(63) Continuation of application No. PCT/EP2018/053552, filed on Feb. 13, 2018.

(30) Foreign Application Priority Data

Feb. 21, 2017 (DE) ..................... 10 2017 202 802.5

(51) Int. Cl.
*G02B 17/08* (2006.01)
*G02B 5/08* (2006.01)
(Continued)

(52) U.S. Cl.
CPC ....... *G02B 17/0892* (2013.01); *G02B 5/0833* (2013.01); *G02B 5/0858* (2013.01);
(Continued)

(58) Field of Classification Search
CPC .. G02B 5/0833; G02B 5/0858; G02B 5/0891; G02B 17/0808; G02B 17/084;
(Continued)

(56) References Cited

U.S. PATENT DOCUMENTS 5,283,692 A    2/1994 Herbst
5,646,976 A *  7/1997 Gutman ................. G21K 1/062
                                                        378/82

(Continued)

FOREIGN PATENT DOCUMENTS

DE    10 2010 004 827 A1    9/2010
DE    10 2009 048 553 A1    3/2011
(Continued)

OTHER PUBLICATIONS

Spiller et al., "Multilayer Coating and Tests of a 10x Extreme Ultraviolet Lithographic Camera," Lawrence Livermore National Library, 23rd Annual International Symposium on Microlithography, Feb. 19, 1998. (Year: 1998).*

(Continued)

*Primary Examiner* — Nicholas R. Pasko
(74) *Attorney, Agent, or Firm* — Fish & Richardson P.C.

(57) ABSTRACT

A catadioptric lens includes at least two optical elements arranged along an optical axis. Both optical elements are configured as a mirror having a substrate and a highly reflective coating applied to an interface of the substrate. The highly reflective coating extends from the interface of the substrate along a surface normal. At least one of the highly reflective coatings has one or a plurality of layers. The optical total layer thickness of the one layer of the plurality of layers increases radially from the inner area outward.

20 Claims, 10 Drawing Sheets

(51) Int. Cl.
    G02B 27/28        (2006.01)
    G02B 5/30         (2006.01)
(52) U.S. Cl.
    CPC ......... *G02B 5/0891* (2013.01); *G02B 5/3091* (2013.01); *G02B 17/084* (2013.01); *G02B 17/0808* (2013.01); *G02B 27/286* (2013.01); *G02B 17/0856* (2013.01)
(58) Field of Classification Search
    CPC ............ G02B 17/0856; G02B 17/0892; G02B 27/286; G02B 5/3083; G02B 5/3091
    See application file for complete search history.

(56) References Cited

U.S. PATENT DOCUMENTS

| | | | |
|---|---|---|---|
| 5,717,518 A | 2/1998 | Shafer et al. | |
| 5,911,858 A * | 6/1999 | Ruffner ................ | C23C 14/044 204/192.15 |
| 6,226,349 B1 * | 5/2001 | Schuster ............... | G21K 1/062 378/81 |
| 6,317,483 B1 * | 11/2001 | Chen ..................... | B82Y 10/00 378/84 |
| 6,421,417 B1 * | 7/2002 | Jiang ..................... | B82Y 10/00 359/846 |
| 6,927,901 B2 * | 8/2005 | Mann ................... | G02B 5/0891 359/857 |
| 6,958,864 B2 * | 10/2005 | McGuire, Jr. ...... | G02B 17/0892 359/489.12 |
| 7,136,234 B2 * | 11/2006 | Shafer ................. | G02B 17/0892 359/385 |
| 7,333,271 B2 | 2/2008 | Jackson | |
| 8,194,230 B2 * | 6/2012 | Chan ..................... | G21K 1/062 359/861 |
| 8,279,404 B2 * | 10/2012 | Chan ..................... | B82Y 10/00 355/71 |
| 8,605,257 B2 * | 12/2013 | Scheible ............ | G02B 17/0892 355/71 |
| 10,120,176 B2 | 11/2018 | Schicketanz et al. | |
| 2002/0129328 A1 | 9/2002 | Komatsuda | |
| 2003/0030917 A1 | 2/2003 | Omura | |
| 2009/0185152 A1 | 7/2009 | Sasaki et al. | |
| 2009/0252977 A1 | 10/2009 | Matsumoto et al. | |
| 2011/0141446 A1 | 6/2011 | Walser et al. | |

FOREIGN PATENT DOCUMENTS

| | | |
|---|---|---|
| DE | 10 2009 047 179 A1 | 6/2011 |
| EP | 2 372 404 A1 | 10/2011 |
| JP | H 10-177139 A | 6/1998 |
| JP | 2002-162566 A | 6/2002 |
| JP | 2003233009 A | 8/2003 |
| JP | 2009-223330 A | 10/2009 |
| JP | 2009-272618 A | 11/2009 |
| JP | 2010-541021 A | 12/2010 |
| JP | 2015219522 A | 12/2015 |
| WO | WO 2009/046137 | 4/2009 |

OTHER PUBLICATIONS

Montcalm et al., "Multilayer coating of 10x projection optics for extreme ultraviolet lithography," Proc. SPIE 3676, Emerging Lithographic Technologies III, (Jun. 25, 1999); doi: 10.1117/12.351157. (Year: 1999).*

Montcalm et al., "Multilayer reflective coating for extreme-ultraviolet lithography," Lawrence Livermore National Library, 23rd Annual International Symposium on Microlithography, Mar. 10, 1998. (Year: 1998).*

Wilhelm et al., "Trends in optical design of projection lenses for UV and EUV lithography," Proc. SPIE 4146, Soft X-Ray and EUV Imaging Systems, (Nov. 8, 2000); doi: 10.1117/12.406667. (Year: 2000).*

Translation of International Search Report for corresponding PCT/EP2018/053552, dated Jun. 11, 2018.

Translation of International Preliminary Report on Patentability for corresponding PCT/EP2018/053552, dated Aug. 27, 2019.

Japanese Office Action, with translation thereof, for corresponding JP Appl No. 2019-545266, dated Jan. 4, 2022.

Japanese Office Action, with translation thereof, for corresponding JP Appl No. 2019-545266, dated Aug. 29, 2022.

Korean Office Action, with translation thereof, for corresponding KR Appl No. 10-2019-7027443, dated Nov. 10, 2022.

* cited by examiner

| Surface | Radius | Thickness/mm | Description |
|---|---|---|---|
| 14 | 0 | 10 | Object |
| 18 | 0 | 94.147 | |
| 20 b | -207.69849 | 94.147 | Mirror M1 |
| 22 b | -274.08664 | 94.147 | Mirror M2 |
| 24 | 0 | 22 | |
| 30 | 0 | 239.854 | |
| 32 b | -260.568 | 239.854 | Mirror M3 |
| 34 b | 164.274 | 239.854 | Mirror M4 |
| 36 | 0 | 1163.165 | |
| | 0 | | Image |

| Coefficients | HR M1 | HR M2 | HR M3 | HR M4 |
|---|---|---|---|---|
| a | 0 | 5.5E-6 | 0 | 4.1E-5 |
| b | 0 | 0 | 0 | 0 |

| Surface | Conic constant | Coefficient Q4 | Coefficient Q6 | Coefficient Q8 | Coefficient Q10 | Coefficient Q12 | Coefficient Q14 | Coefficient Q16 | Coefficient Q18 |
|---|---|---|---|---|---|---|---|---|---|
| M1 | -0.193 | -3.11E-13 | -3.669E-17 | 1.957E-21 | -1.304E-26 | -2.835E-29 | 2.609E-33 | -9.944E-38 | 1.312E-42 |
| M2 | -1.347 | -3.073E-13 | -5.833E-17 | 7.013E-21 | -1.502E-24 | 2.165E-28 | -2.181E-32 | 1.161E-36 | -2.329E-41 |
| M3 | -0.01 | 2.43E-15 | 2.141E-19 | -1.088E-23 | 3.911E-28 | -3.481E-33 | -1.158E-37 | 3.144E-42 | -2.272E-47 |
| M4 | 13.333 | 6.92E-12 | 4.122E-14 | -4.662E-17 | 5.87E-20 | -2.87E-23 | -5.09E-27 | 1.493E-29 | -4.875E-33 |

| # | Material | HR Prior art Layer thickness [nm] | HR M1 Layer thickness [nm] | HR M2 Layer thickness [nm] | HR M3 Layer thickness [nm] | HR M4 Layer thickness [nm] |
|---|---|---|---|---|---|---|
| 1 | $HfO_2$ | 48.7 | 54.0 | 40.8 | 34.6 | 64.0 |
| 2 | $SiO_2$ | 75.1 | 72.8 | 51.7 | 51.3 | 65.4 |
| 3 | $HfO_2$ | 48.8 | 54.1 | 49.6 | 35.0 | 42.5 |
| 4 | $SiO_2$ | 65.1 | 78.4 | 26.5 | 52.3 | 61.8 |
| 5 | $HfO_2$ | 44.4 | 59.3 | 49.4 | 35.5 | 50.5 |
| 6 | $SiO_2$ | 66.6 | 73.6 | 52.5 | 53.3 | 69.6 |
| 7 | $HfO_2$ | 50.5 | 52.9 | 40.7 | 35.9 | 43.7 |
| 8 | $SiO_2$ | 69.4 | 76.7 | 54.1 | 54.1 | 59.6 |
| 9 | $HfO_2$ | 44.2 | 62.2 | 38.1 | 36.3 | 41.1 |
| 10 | $SiO_2$ | 62.8 | 71.2 | 52.5 | 54.6 | 60.4 |
| 11 | $HfO_2$ | 43.1 | 47.2 | 36.5 | 36.5 | 45.0 |
| 12 | $SiO_2$ | 65.7 | 65.2 | 52.3 | 54.9 | 68.3 |
| 13 | $HfO_2$ | 50.4 | 45.0 | 37.4 | 36.6 | 45.7 |
| 14 | $SiO_2$ | 68.2 | 64.3 | 55.1 | 55.1 | 60.3 |
| 15 | $HfO_2$ | 42.6 | 44.0 | 39.7 | 36.8 | 40.2 |
| 16 | $SiO_2$ | 60.0 | 63.0 | 59.9 | 55.3 | 57.4 |
| 17 | $HfO_2$ | 39.4 | 43.7 | 51.6 | 37.0 | 38.7 |
| 18 | $SiO_2$ | 56.6 | 62.7 | 81.9 | 55.7 | 56.2 |
| 19 | $HfO_2$ | 36.6 | 43.4 | 45.3 | 37.5 | 37.8 |
| 20 | $SiO_2$ | 51.7 | 62.4 | 60.1 | 57.0 | 55.6 |
| 21 | $HfO_2$ | 34.6 | 43.1 | 40.3 | 39.9 | 39.8 |
| 22 | $SiO_2$ | 53.0 | 62.0 | 56.7 | 67.2 | 19.4 |
| 23 | $HfO_2$ | 37.2 | 42.5 | 40.6 | 58.9 | 42.5 |
| 24 | $SiO_2$ | 56.3 | 61.0 | 89.0 | 67.6 | 56.9 |
| 25 | $HfO_2$ | 38.2 | 41.1 | 122.3 | 42.0 | 38.3 |
| 26 | $SiO_2$ | 56.1 | 57.5 | 57.5 | 60.8 | 55.8 |
| 27 | $HfO_2$ | 36.8 | 35.7 | 42.4 | 41.1 | 38.2 |
| 28 | $SiO_2$ | 51.1 | 45.7 | 67.2 | 63.5 | 53.5 |
| 29 | $HfO_2$ | 33.0 | 29.7 | 53.7 | 44.6 | 10.8 |
| 30 | $SiO_2$ | 102.9 | 49.7 | 72.6 | 68.5 | 117.5 |
| 31 | $HfO_2$ | | 36.8 | 45.0 | 46.4 | |
| 32 | $SiO_2$ | | 56.5 | 64.4 | 68.4 | |

Fig. 5B

| | | | | | | |
|---|---|---|---|---|---|---|
| 33 | HfO$_2$ | | 38.5 | 45.9 | 48.7 | |
| 34 | SiO$_2$ | | 55.4 | 75.4 | 70.5 | |
| 35 | HfO$_2$ | | 35.5 | 51.8 | 45.1 | |
| 36 | SiO$_2$ | | 48.0 | 68.4 | 64.9 | |
| 37 | HfO$_2$ | | 30.6 | 46.3 | 45.4 | |
| 38 | SiO$_2$ | | 46.2 | 75.7 | 74.8 | |
| 39 | HfO$_2$ | | 34.0 | 59.2 | 53.5 | |
| 40 | SiO$_2$ | | 52.2 | 80.1 | 68.5 | |
| 41 | HfO$_2$ | | 36.2 | 78.3 | 44.5 | |
| 42 | SiO$_2$ | | 51.2 | 84.0 | 69.2 | |
| 43 | HfO$_2$ | | 32.8 | 59.8 | 54.7 | |
| 44 | SiO$_2$ | | 44.6 | 76.0 | 76.9 | |
| 45 | HfO$_2$ | | 30.7 | 47.1 | 47.1 | |
| 46 | SiO$_2$ | | 47.4 | 74.2 | 71.2 | |
| 47 | HfO$_2$ | | 33.6 | 56.7 | 53.5 | |
| 48 | SiO$_2$ | | 46.7 | 72.4 | 79.5 | |
| 49 | HfO$_2$ | | 27.4 | 47.9 | 51.6 | |
| 50 | SiO$_2$ | | 87.8 | 85.8 | 76.6 | |
| 51 | HfO$_2$ | | | 56.8 | 53.7 | |
| 52 | SiO$_2$ | | | 76.9 | 37.9 | |
| 53 | HfO$_2$ | | | 67.1 | | |
| 54 | SiO$_2$ | | | 78.7 | | |
| 55 | HfO$_2$ | | | 61.9 | | |
| 56 | SiO$_2$ | | | 86.6 | | |
| 57 | HfO$_2$ | | | 51.7 | | |
| 58 | SiO$_2$ | | | 97.1 | | |
| 59 | HfO$_2$ | | | 129.5 | | |
| 60 | SiO$_2$ | | | 94.0 | | |
| 61 | HfO$_2$ | | | 58.6 | | |
| 62 | SiO$_2$ | | | 80.0 | | |
| 63 | HfO$_2$ | | | 65.9 | | |
| 64 | SiO$_2$ | | | 78.1 | | |
| 65 | HfO$_2$ | | | 65.1 | | |
| 66 | SiO$_2$ | | | 87.1 | | |
| 67 | HfO$_2$ | | | 52.6 | | |
| 68 | SiO$_2$ | | | 44.2 | | |

| Surface | Radius | Thickness/mm | Material | Description |
|---|---|---|---|---|
| 15 | 0.000 | 1.500 | | Object |
| 48 | 1000.000 | 7.000 | Fused quartz | Lens element 49 |
| 52 | 908.968 | 36.000 | | |
| 54 | -48.244 | 9.500 | Fused quartz | Lens element 53 |
| 56b | -63.204 | 9.500 | Fused quartz | Mirror layer 53s |
| 54 | 48.244 | 36.000 | | |
| 52 | -908.968 | 7.000 | Fused quartz | Lens element 49 |
| 50b | -1000 | 7.000 | Fused quartz | Mirror layer 49s |
| 52 | 908.968 | 36.108 | | |
| 60 | 90.635 | 2.000 | Fluorite | Lens element 59 |
| 62 | -2.044 | 0.017 | | |
| 64 | -2.044 | 5.026 | Fused quartz | Lens element 63 |
| 66 | -6.687 | 1.000 | | |
| 68 | 36.530 | 2.500 | Fused quartz | Lens element 67 |
| 70 | 19.346 | 7.892 | | |
| 72 | 28.138 | 9.746 | Fused quartz | Lens element 71 |
| 74 | 30.177 | 4.181 | | |
| 76 | -965.352 | 10.000 | Fused quartz | Lens element 75 |
| 78 | -18.268 | 1.000 | | |
| 80 | 517.022 | 6.000 | Fused quartz | Lens element 79 |
| 82 | -34.465 | 1.000 | | |
| 84 | 17.997 | 7.546 | Fused quartz | Lens element 83 |
| 86 | 13.518 | 9.532 | | |
| 88 | -13.441 | 10.000 | Fused quartz | Lens element 87 |
| 90 | -24.138 | 30.636 | | |
| 92 | 37.494 | 6.000 | Fused quartz | Lens element 91 |
| 94 | -120.297 | 2.000 | | |
| 96 | -50.308 | 4.000 | Fused quartz | Lens element 95 |
| 98 | -67.007 | 65.000 | | |
| 42 | 0.000 | | | Image |

Fig. 8

| Coefficients | HR (Mirror M1', Mirror layer 49s) | HR (Mirror M2', Mirror layer 53s) |
|---|---|---|
| a | 4.4E-6 | 2.8E-6 |
| b | 0 | 0 |

Fig. 9

| # | Material | AR Prior art Layer thickness [nm] | Material | AR Lens 10' Layer thickness [nm] |
|---|---|---|---|---|
| | Substrate | | Substrate | |
| 1 | HfO2 | 4.5 | HfO2 | 4.0 |
| 2 | SiO2 | 42.7 | SiO2 | 18.8 |
| 3 | HfO2 | 22.6 | HfO2 | 4.1 |
| 4 | SiO2 | 16.8 | SiO2 | 6.0 |
| 5 | HfO2 | 40.2 | HfO2 | 4.1 |
| 6 | SiO2 | 16.5 | SiO2 | 6.0 |
| 7 | HfO2 | 4.2 | HfO2 | 72.4 |
| 8 | SiO2 | 19.5 | SiO2 | 16.6 |
| 9 | HfO2 | 10.6 | MgF2 | 48.7 |
| 10 | SiO2 | 56.7 | | |
| 11 | HfO2 | 25.4 | | |
| 12 | SiO2 | 8.0 | | |
| 13 | HfO2 | 50.2 | | |
| 14 | MgF2 | 67.4 | | |

Fig. 10

| # | Material | Prior art HR Lens element 49+53 (Surface 50b+56b) Layer thickness [nm] | Lens 10' HR (Mirror M1', Surface 50b) Layer thickness [nm] | Material | Lens 10' HR (Mirror M2', Surface 56b) Layer thickness [nm] |
|---|---|---|---|---|---|
| 1 | Aluminum | 100.0 | 100.0 | HfO2 | 67.7 |
| 2 | SiO2 | 46.9 | 47.4 | SiO2 | 66.9 |
| 3 | HfO2 | 39.4 | 39.8 | HfO2 | 47.0 |
| 4 | SiO2 | 60.9 | 61.7 | SiO2 | 72.0 |
| 5 | HfO2 | 39.4 | 39.6 | HfO2 | 57.8 |
| 6 | SiO2 | 61.1 | 61.4 | SiO2 | 68.3 |
| 7 | HfO2 | 41.5 | 34.3 | HfO2 | 44.6 |
| 8 | SiO2 | 39.5 | 130.8 | SiO2 | 73.1 |
| 9 | HfO2 | 4.9 | 33.1 | HfO2 | 56.4 |
| 10 | SiO2 | 66.1 | 27.6 | SiO2 | 67.0 |
| 11 | HfO2 | 40.4 | 17.2 | HfO2 | 43.2 |
| 12 | SiO2 | 60.5 | | SiO2 | 66.6 |
| 13 | HfO2 | 79.3 | | HfO2 | 49.8 |
| 14 | Substrate | | | SiO2 | 72.3 |
| 15 | | | | HfO2 | 44.0 |
| 16 | | | | SiO2 | 63.6 |
| 17 | | | | HfO2 | 41.7 |
| 18 | | | | SiO2 | 64.5 |
| 19 | | | | HfO2 | 45.2 |
| 20 | | | | SiO2 | 70.0 |
| 21 | | | | HfO2 | 43.6 |
| 22 | | | | SiO2 | 61.7 |
| 23 | | | | HfO2 | 38.4 |
| 24 | | | | SiO2 | 58.0 |
| 25 | | | | HfO2 | 36.8 |
| 26 | | | | SiO2 | 56.8 |
| 27 | | | | HfO2 | 36.3 |
| 28 | | | | SiO2 | 56.4 |
| 29 | | | | HfO2 | 36.0 |
| 30 | | | | SiO2 | 53.3 |
| 31 | | | | HfO2 | 34.5 |
| 32 | | | | SiO2 | 51.7 |
| 33 | | | | HfO2 | 42.4 |
| 34 | | | | SiO2 | 19.7 |
| 35 | | | | HfO2 | 44.2 |
| 36 | | | | SiO2 | 59.0 |
| 37 | | | | HfO2 | 95.0 |
| | | | | Substrate | |

Fig. 11

CATADIOPTRIC LENS AND OPTICAL SYSTEM COMPRISING SUCH A LENS

FIELD

The present disclosure relates to a catadioptric lens, including at least two optical elements, which are arranged along an optical axis, wherein both optical elements are embodied as a mirror which includes a substrate and a highly reflective coating that is applied to a boundary layer of the substrate, wherein the highly reflective coating extends from the mirror surface along a surface normal. Further, the disclosure relates to an optical system including such a lens.

BACKGROUND

A catadioptric lens is known from U.S. Pat. No. 5,717,518.

Such a lens is used in the field of photolithography, for example in a microscope, for the purposes of inspecting a wafer or a mask. Further, the lens can be used as a projection lens for photolithographic imaging of the mask on the wafer.

Such a microscope or projection lens is desirably corrected with respect to optical imaging aberrations in order to have a high imaging quality. The optical imaging aberrations include chromatic aberrations that are expressed by an offset of light of different wavelengths in the direction of the optical axis (longitudinal chromatic aberration) or transverse to the optical axis (transverse chromatic aberration). Usually, chromatic aberrations can be traced back to optical properties of the optical elements, more particularly of the refractive optical units, used in the lens.

However, in the case of high desired properties for the imaging quality (Strehl ratio>85%), the highly reflective (HR) and anti-reflection (AR) coatings on the boundary layers also have a substantial influence on the longitudinal chromatic aberration of the overall system.

The HR and AR coatings on the boundary layers moreover bring about changes in the polarization state of the light, which also lead to imaging aberrations within the meaning of a smearing of the point imaging and hence to a reduction in the Strehl ratio.

It is known that a number of solutions for counteracting chromatic aberrations resulting from the dispersion of the optical materials. By way of example, U.S. Pat. No. 5,717,518 discloses a catadioptric imaging system, in which use is made of an achromatic field lens group made of a plurality of optical elements, which are formed from two or more different refractive materials.

However, the known catadioptric imaging system is disadvantageous in that complex coatings are used on every optically effective surface if use is made of light from a broad spectral range, for example a wavelength range between 200 nm and 450 nm, and the coatings may likewise cause chromatic aberrations. It is not possible, or only possible with great difficulty, to correct these chromatic aberrations by way of a suitable choice of the optical elements. The coatings are desirable for designing mirror surfaces with good reflectivity or for maximizing the transmission through lens surfaces. DE 10 2010 004 827 A1 has disclosed a catadioptric high aperture lens for inspecting a wafer in the dark field. The lens consists of a catadioptric lens portion including a Mangin mirror. The Mangin mirror has a perforation, through which the wafer is illuminated and the light scattered back by the wafer is transmitted. The back-scattered light is reflected at a front surface mirror and subsequently reflected at the Mangin mirror, and imaged on a detector via a dioptric lens portion. In the known catadioptric lens, provision is made of a lens element pair, embodied as an achromat and made of different materials, for correcting linear chromatic aberrations of the lens. Here, the mirror surfaces are desirably provided with well reflecting layers (HR coating); the lens surfaces are desirably provided with reflection-reducing layers (AR coating).

However, a disadvantage of the known high aperture lens including a Mangin mirror and front surface mirror, each provided with the appropriate HR coatings, is that chromatic aberrations with a nonlinear spectral profile of third and higher order occur when impinging the lens with light in a broad spectral range, in particular a spectral range between 200 nm and 450 nm wavelength. Correcting such chromatic aberrations using conventional refractive optical elements, such as, e.g., an achromatic lens doublet, is not possible owing to the structure thereof. Moreover, such a correction often already fails due to the fact that suitable optical materials are not available for producing the known refractive optical elements for the desired spectral range of between 200 nm and 450 nm wavelength.

Moreover, U.S. Pat. No. 7,333,271 describes the correction of chromatic aberrations of an imaging system via two dichroic Mangin mirrors. Both Mangin mirrors include a first surface and a second surface in each case, with the reflection of the light at the respective first surface reducing greatly beyond a certain transition wavelength. The light transmitted through the respective first surface is subsequently incident on the respective second surface of the respective Mangin mirror and reflected there. In this system, the transition wavelength and the distance between the surfaces of the respective Mangin mirrors are chosen in such a way that the light path in the overall system remains independent of the wavelength.

However, a disadvantage of this arrangement is that two Mangin mirrors are used for correcting chromatic aberrations. Moreover, a further disadvantage of the present system is that the latter cannot be used for light with a continuous spectral range since the at least two employed wavelengths are desirably clearly separated from the transition wavelength in order to bring about a correction of the chromatic aberrations. A further disadvantage of the arrangement is that the additional light path beyond the transition wavelength are desirably precisely compensated by the second Mangin mirror. Owing to its design, a correction of nonlinear spectral profiles of the chromatic aberration cannot be set on the basis of this system.

SUMMARY

The present disclosure seeks to develop a catadioptric lens of the type set forth at the outset, which is provided with all layers used for the correct function, to the extent that chromatic aberrations and changes in the polarization state of the light are effectively correctable using the smallest possible number of optical components when using light from a broad and continuous spectral range.

The disclosure provides a catadioptric lens with the HR coating including one or more plies, wherein the optical overall layer thickness of the one or more plies increases radially from the inside out.

The at least two optical elements serve to image a wafer or a mask from the object plane onto an image plane. To this end, the light is guided along the optical axis from the object plane to the image plane with the aid of the optical elements.

Within the scope of the light guidance, the light interacts with the optical material/materials from which the optical elements and the coatings thereof are formed. Moreover, the coatings produce interferences as a result of multiple reflections in the thin partial plies, the multiple reflections having a great influence on the phase shift, and hence on the longitudinal chromatic aberration and the polarization state. In the case of broadband light, there is a superposition of light of different wavelengths, which is refracted differently depending on wavelength at the boundary layer between the optical material, the coating on the boundary layers and the surroundings and which is influenced differently in the wavefront phase.

According to the disclosure, the chromatic aberrations accompanying the phase shift can be effectively corrected with the aid of the mirrors. To this end, the mirror has an HR coating in each case, the incident light being reflected there. The HR coating may include a single ply, preferably a dielectric ply, or alternatively a sequence of a plurality of (preferably dielectric) plies that extends along the optical axis. Further, the HR coating is embodied in such a way that, with respect to the optical axis, the optical overall layer thickness of the one or more plies substantially increases to the outside in the radial direction.

In the case of a single ply, the optical overall layer thickness emerges from the optical layer thickness of the single ply, which is given by the product of the geometric layer thickness of the single ply and the refractive index of the optical material on which the single ply is based. In the case of a plurality of plies, the optical overall layer thickness is the sum of the respective optical layer thicknesses of the individual plies. The different plies may have at least two different refractive indices.

The optical overall layer thickness of the one or more plies substantially increases from the inside out in the radial direction. By way of example, the optical overall layer thickness may increase continuously to the outside in the radial direction. Alternatively, the optical overall layer thickness can vary as desired from the inside to the outer edge of the HR coating, with the optical overall layer thickness of the outer edge of the HR coating being greater than in the inner region of the HR coating. In addition to the preferably dielectric ply or in addition to the plurality of preferably dielectric plies, the optical overall layer thickness of which increases radially from the inside out, the HR coating may include at least one further ply, for example a metal layer.

An optical overall layer thickness increasing or varying in this manner ensures that light reflected at different radial positions of the mirror surface passes along different optical path lengths when passing through the one or more preferably dielectric plies. This brings about a further phase shift which is superposed on the phase shift of the optical elements without a coating. Advantageously, this corrects chromatic aberrations in a simple manner. Further advantageously, the correction is particularly effective for light from a broadband and continuous spectral range, in particular below 400 nm, preferably below 300 nm, further preferably below 200 nm. The spectral range preferably includes a minimum wavelength and a maximum wavelength that is greater than 1.1-times the minimum wavelength.

In a preferred configuration, the difference between a maximum and minimum optical overall layer thickness of the HR coating is more than 2% of the average value of the optical overall layer thickness of the HR coating.

This measure ensures that the optical overall layer thickness of the at least one ply of the HR coating increases sufficiently in the radial direction. Advantageously, this measure brings about a sufficiently large chromatically variable phase shift between the light rays reflected at various radial points of the mirror surface, the phase shift therefore particularly effectively compensating the phase shift between the light rays, further improving the correction of the chromatic aberrations.

In a further preferred configuration, the optical overall layer thickness of the HR coating has a radially symmetric profile in relation to the optical axis.

Consequently, the optical overall layer thickness of the HR coating has a profile in the radial direction that remains the same in relation to rotations with respect to the optical axis. This measure is particularly advantageous in view of a rotationally symmetric structure of the lens.

In relation to the optical axis, the optical overall layer thickness of the HR coating increases monotonically from the inside out in the radial direction in a further preferred configuration.

Consequently, the light reflected at the mirror surface traverses an optical path length that increases monotonically with the radial distance of the reflection position, as measured proceeding from the optical axis. This advantageously brings about a particularly effective correction of the chromatic aberrations of light with a broadband and continuous wavelength spectrum.

In a further preferred configuration, the optical overall layer thickness of the HR coating depends on a quadratic and/or a fourth power of the radial distance, which is defined from the optical axis.

In this configuration, an optical overall layer thickness of the HR coating that varies greatly depending on the radial distance is brought about, the optical overall layer thickness being advantageous for the correction of complex chromatic aberrations. Preferably, the optical overall layer thickness of the HR coating is proportional to the sum of the square power and the fourth power of the radial distance, where the square and/or fourth power may be multiplied by a coefficient. Further preferably, the sum on which the optical overall layer thickness of the HR coating depends additionally includes a constant, for example 1.

In a further preferred configuration, the lens is designed to be used for a used wavelength range, the lower limit of which lies below 400 nm, preferably below 300 nm, further preferably below 200 nm. Here, the maximum wavelength can be at least 1.1-times the minimum wavelength.

In a further preferred configuration, at least one optical element includes an anti-reflection coating or at least one further optical element includes a highly reflective coating.

This measure brings about a reduction in the phase retardation between light polarized in the radial direction and light polarized in the tangential direction after passing through the overall system. This reduction in the phase retardation is tantamount to a change in the polarization state. Here, the effect of the first HR coating, which inevitably changes the polarization state, is compensated by the effect of a further coating or a plurality of further coatings. By way of example, it is possible to reduce by a factor of at least two the phase retardation between light polarized in the radial direction and light polarized in the tangential direction for at least one wavelength of the used wavelength range, in particular a broadband wavelength range, in relation to the case corresponding to the prior art.

The prior art is characterized by the use of identical HR coatings on a plurality of surfaces. The highly reflective and/or anti-reflection coating may be applied to at least one optical element, more particularly to a further optical element of the lens. In a further preferred configuration, the lens includes at least one further mirror, a Mangin mirror and/or a lens element.

Consequently, the lens according to the disclosure includes at least two mirrors, wherein at least one of the two mirrors is preferably embodied as a Mangin mirror such that the correction of the chromatic aberrations is advantageously more effective. As an alternative or in addition thereto, the lens may include at least one lens element. Advantageously, this realizes a catadioptric system such that impairments in the imaging properties of the lens as a result of the phase retardation between light polarized in the radial direction and light polarized in the tangential direction are reduced.

In a further preferred configuration, at least one of the optical elements has a perforation for the passage of light.

With the aid of the perforation, which is preferably circular, the light can easily be let through the at least one optical element. Moreover, the substantially circular configuration of the perforation is advantageous for a radially symmetric structure of the lens according to the disclosure. Preferably, the perforation is arranged in a radially symmetric manner around the optical axis.

In a further preferred configuration, at least one of the optical elements includes an HR coating including a dielectric material and a metal.

Dielectric materials, for example magnesium fluoride ($MgF_2$), calcium fluoride ($CaF_2$), quartz ($SiO_2$), lanthanum fluoride ($LaF_3$), gadolinium fluoride ($GdF_3$), aluminum fluoride ($AlF_3$), yttrium fluoride ($YF_3$), ytterbium fluoride ($YbF_3$), chiolite ($Na_5Al_3F_{14}$), aluminum oxide ($Al_2O_3$), hafnium oxide ($HfO_2$), zirconium oxide ($ZrO_2$), are distinguished by low absorption and a sufficient refractive power contrast for broadband light. Advantageously, the lens according to the disclosure is particularly suitable for applications with light from a broad spectral range, in particular from the ultraviolet (UV) and/or the vacuum ultraviolet (VUV) spectral range. The dielectric material may be contained in a ply or in a plurality of plies of the HR coating of a mirror of the lens, for example of the aforementioned mirror with the radially increasing optical overall layer thickness. Alternatively, different plies may include different dielectric materials. The HR coating can be formed exclusively of one or more dielectric materials. As an alternative or in addition thereto, at least one metal may be contained in the HR coating. The reflection properties of the HR coating are advantageously improved.

In a further preferred configuration, the lens according to the disclosure includes at least one transparent plate with at least one plane boundary layer, wherein the transparent plate acts as a beam splitter.

The transparent plate which acts as a beam splitter in a reflected light microscope, for example, preferably facilitates the input coupling of the illumination light into the lens according to the disclosure. Moreover, the plane boundary layer is advantageous for the purposes of the simple design of the lens.

In a further preferred configuration, at least one optical element, preferably a Mangin mirror, includes an aspherized mirror surface and/or lens surface.

The correction of the optical aberrations is advantageously particularly effective with the aid of the aspherization of the at least one mirror surface and/or lens surface. Preferably, two mirror surfaces of the lens according to the disclosure are aspherized.

In a further preferred configuration, the numerical aperture of the lens according to the disclosure is greater than 0.75.

Advantageously, the lens according to the disclosure facilitates particularly effective focusing of light from a broadband wavelength spectrum. As an alternative or in addition thereto, the lens may have a rotationally symmetric structure.

In a further preferred configuration, the lens according to the disclosure has a Strehl ratio that is greater than 85%.

In particular, this Strehl ratio is reached without taking account of losses in the imaging quality by the coatings. The configuration of coatings according to the disclosure allows this Strehl ratio to be obtained even after the application of coatings. This measure facilitates a lens in which the imaging quality in the image plane is advantageously particularly high following the light guidance by the optical elements of the lens. By way of example, such a Strehl ratio can be obtained for all wavelengths in a used wavelength range below 400 nm, preferably below 300 nm, further preferably below 200 nm. What this achieves is that this Strehl ratio is not substantially reduced in relation to the value without a coating in the case of optical elements with coatings whose layer thickness can be variable.

In a further preferred configuration, the lens is designed to reduce by a factor of at least two a phase retardation between radially and tangentially polarized light following reflection of the light at the highly reflective coating of one of the optical elements by reflection of the light at the highly reflective coating of at least one further one of the optical elements or the transmission of the light through an anti-reflection coating (AR coating) of one of the optical elements, at least for a wavelength between a maximum and a minimum used wavelength, preferably for a wavelength band in the used wavelength range.

As a result of this configuration, the polarization state with respect to the lens specified at the outset is largely maintained by way of a specific configuration of the HR and AR coatings. Here, the effect of a coating, which inevitably changes the polarization state, is compensated by the effect of a further coating or a plurality of further coatings.

An optical system according to the disclosure for inspecting a wafer or a mask, or for photolithographic imaging of the mask on the wafer, includes a lens according to any of the configurations specified above. In particular, the optical system can be embodied as a microscope and/or wafer or mask inspection apparatus for manufacturing semiconductors or manufacturing components. Alternatively, the optical system can be embodied as a projection exposure apparatus for the exposure of light-sensitive resists in the manufacture of semiconductors, wherein the projection exposure apparatus, in addition to the lens, includes an illumination device and a mask with a structure to be transferred.

Further advantages and features emerge from the following description and the accompanying drawing.

It goes without saying that the aforementioned features and the features yet to be explained below can be used not only in the respectively specified combination but also in other combinations or on their own, without departing from the scope of the present disclosure.

BRIEF DESCRIPTION OF THE DRAWINGS

Exemplary embodiments of the disclosure are illustrated in the drawing and described hereinafter with reference thereto. In the figures:

FIG. 3 shows a summary of coefficients of a rotationally symmetric conic section asphere of the lens of FIG. 1 in the form of a table;

FIG. 5A-5B shows a summary of layer design parameters of a plurality of highly reflective coatings of the lens of FIG. 1 in the form of a table;

FIG. 8 shows a summary of design data of the lens of FIG. 7 in the form of a table;

FIG. 9 shows a summary of layer thickness profile coefficients of the lens of FIG. 7 in the form of a table;

FIG. 10 shows a summary of layer design parameters of a plurality of anti-reflection coatings of the lens of FIG. 7 in the form of a table;

FIG. 11 shows a summary of layer design parameters of a plurality of highly reflective coatings of the lens of FIG. 7 in the form of a table;

DESCRIPTION OF EXEMPLARY EMBODIMENTS

Figure 1:
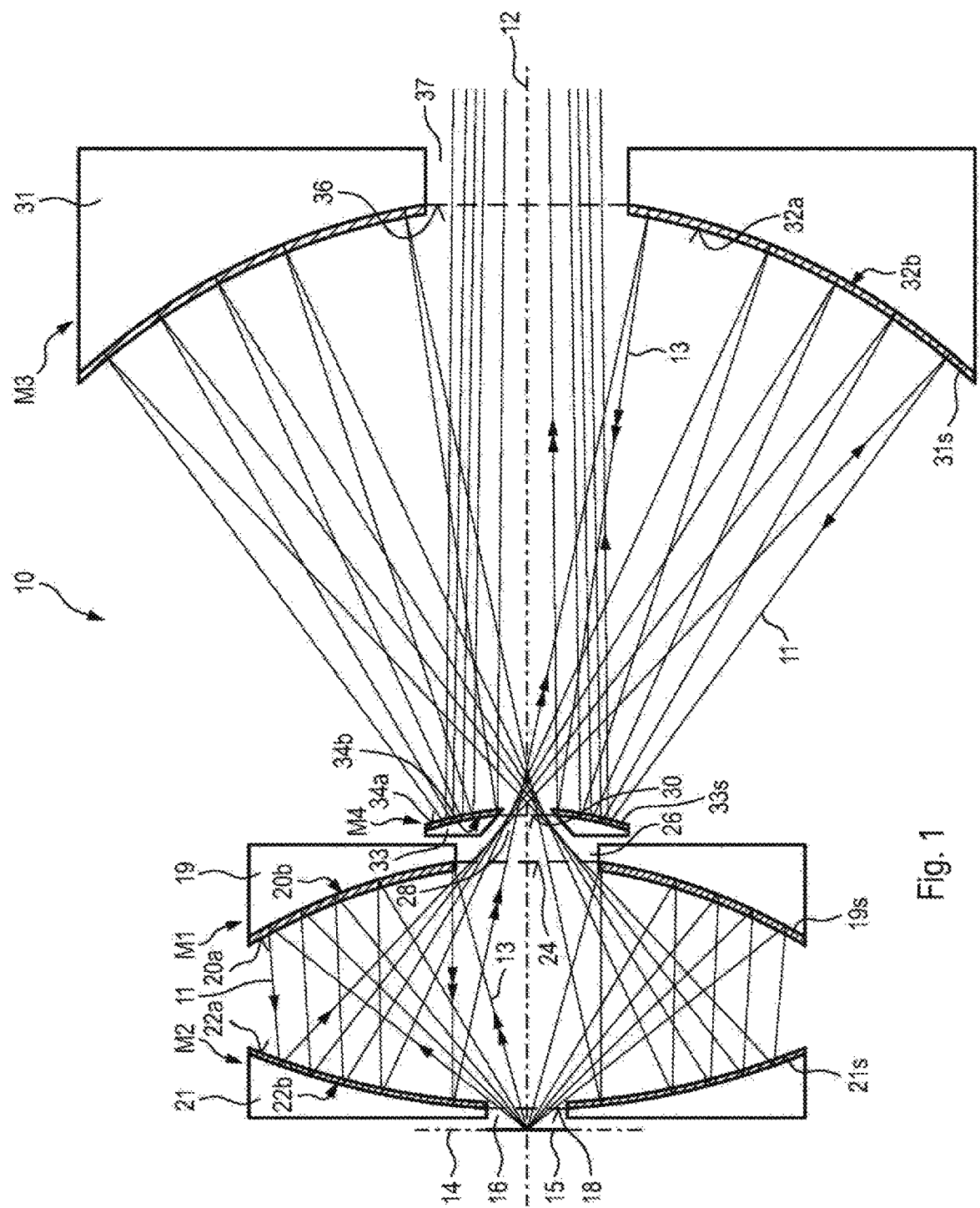
FIG. 1 shows a schematic sectional view of a lens including four mirrors.

FIG. 1 shows a lens 10 including four optical elements M1, M2, M3, M4, embodied as mirrors, which are arranged in succession along an optical axis 12. An object 15 to be inspected, for example a wafer or a mask arranged in the object plane 14, can be imaged onto an image plane with the aid of the lens 10. As a result of this, it is possible to obtain information about the surface condition of the object to be inspected. For reasons of clarity, the object to be inspected and the image plane are not shown in FIG. 1.

All four mirrors M1-M4 have a rotationally symmetric embodiment with respect to the optical axis 12. The mirrors M1-M4 each include a substrate 19, 21, 31, 33 and a surface 20b, 22b, 32b, 34b. The surface 20b, 22b, 32b, 34b is applied to the respective substrate 19, 21, 31, 33 and includes a highly reflective coating (HR coating) 19s, 21s, 31s, 33s, which extends from a boundary layer 20b, 22b, 32b, 34b of the respective substrate 19, 21, 31, 33 along a surface normal up to a second boundary layer 20a, 22a, 32a, 34a of the HR coating to the ambient medium, e.g., air.

For the purposes of reflecting the light in the direction of the object plane 14, the surfaces 20b, 32b of the mirrors M1, M3 are embodied facing same. For the purposes of reflecting the light in the direction away from the object plane 14, the mirror surfaces 22b, 34b of the mirrors M2, M4 are embodied facing away from same.

The respective HR coating 19s, 21s, 31s, 33s includes one or more dielectric plies. At least one of the HR coatings 19s, 21s, 31s, 33s of the surfaces 20b, 22b, 32b, 34b is formed exclusively from a dielectric material or a plurality of dielectric materials. In relation to the optical axis 12, the optical overall layer thickness of the at least one dielectric ply increases from the inside out in the radial direction. Preferably, the difference between the maximum and the minimum optical overall layer thickness in at least one HR coating is more than 2% of the average value of the optical overall layer thickness in this coating. In FIG. 1, the HR coatings of the surfaces 20b, 22b, 32b, 34b of the mirrors M1-M4 each have a hatched depiction, wherein these are shown with a magnified layer thickness for improved visibility which, however, is not true to scale. The layer thickness profile increasing radially to the outside has not been shown for reasons of clarity.

A light ray 11, 13 emanating from the object 15 passes through an imagined surface 18 of a perforation 16 of the mirror M2. The perforation 16 has a circular configuration such that the optical axis 12 extends through the center of the circle. The light ray 11, 13 is then reflected by the highly reflective coating 19s on the surface 20b of the mirror M1 to the coated surface 22b of the mirror M2. The light ray 11, 13 is reflected again at the coated surface 22b before the light ray reaches the mirror M3 through two further imagined surfaces 24, 30 of two perforations 26, 28 of the mirrors M1 and M4. At the mirror M3, the light ray 11, 13 is reflected at the coated surface 32b to the mirror M4. Finally, the light ray 11, 13 is reflected at the surface with coating 33s of the mirror M4 in the direction of a perforation 37 of the mirror M3, the light ray 11, 13 passing through the imagined surface 36 thereof.

In exemplary fashion and for the purposes of simplified pictorial representation, FIG. 1 shows that the light ray 11, 13 is reflected at the boundary layers of the substrates 19, 21, 31, 33.

Figures 2, 4, 6:
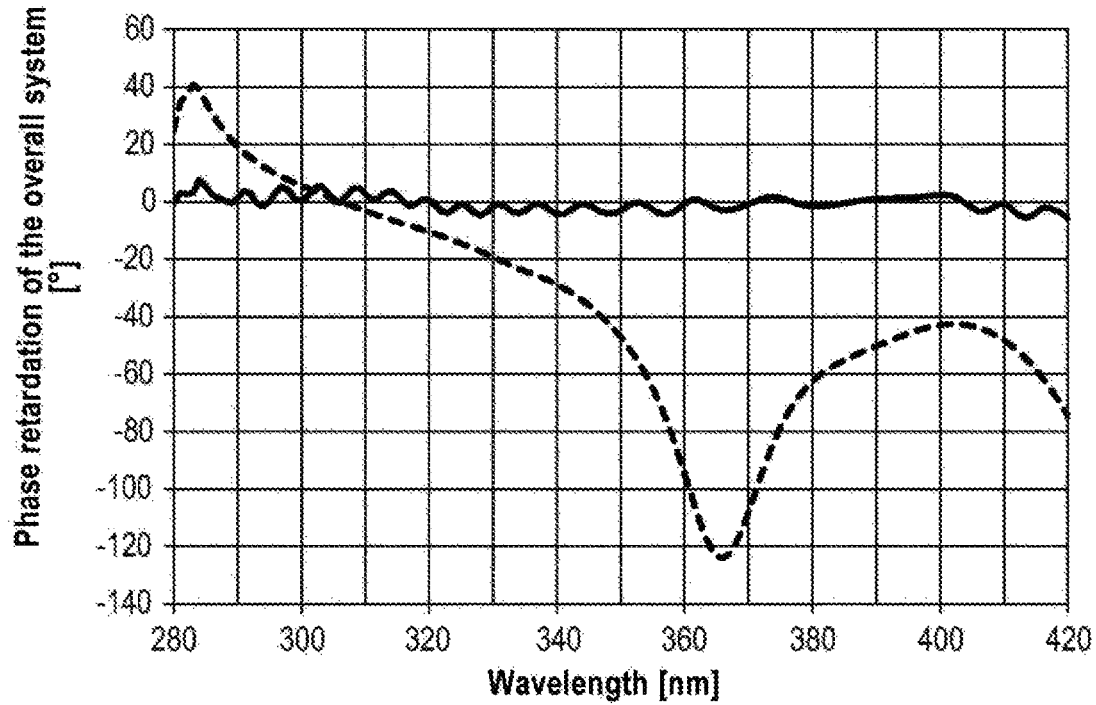
FIG. 2 shows a summary of the design data of the lens of FIG. 1 in the form of a table.
FIG. 4 shows a summary of layer thickness profile coefficients of the lens of FIG. 1 in the form of a table.
FIG. 6 shows a schematic diagram of the phase retardation of the light after passing through the lens of FIG. 1, as a function of the light wavelength.

The design data of the various optical elements of the lens 10 shown in FIG. 1 are summarized in FIG. 2 in the form of a table. The radius relates to the radius of curvature of the surfaces 20b, 22b, 32b, 34b. A radius of curvature is not defined for the remaining surfaces, and a value of 0 is specified. The thickness specifies the extent along the optical axis 12 between two adjacent surfaces impinged by the light ray 11, 13.

By way of example, the light ray 11, 13 reflected at the coated surface 22b passes through the interstice between the mirrors M1, M2. The surface 22b has a radius of curvature of −274.08664 mm, with the interstice having an extent of 94.147 mm in the direction of the optical axis 12. Here, a radius of curvature with a positive/negative sign (positive signs are not explicitly shown) corresponds to an optical surface arched counter to/in the direction of incidence of the light.

The coated surfaces 20b, 22b, 32b, 34b of the mirrors M1, M2, M3, M4 are embodied as rotationally symmetric conic section aspheres, the coefficients of which are summarized in FIG. 3 in the form of a table. The conic section asphere function and the parameters thereof are described in DIN ISO 10110 part 12.

The optical overall layer thickness of the coatings on the surfaces 20b, 22b, 32b, 34b in the radial direction has a profile that remains unchanged in relation to rotations about the optical axis 12.

Further, the optical overall layer thickness d of the coating on the surfaces 22b and 34b of the mirrors M2 and M4 obeys the following dependency:

$$d(h) \sim (1 + ah^2 + bh^4) \tag{1}$$

Here, d denotes the scaling factor of the optical overall layer thickness of the at least one dielectric ply of the respective coating on the surfaces 22b and 34b, and h denotes the radial distance defined from the optical axis 12, with a, b being constant coefficients. The values for the coefficients a, b are summarized in FIG. 4 in the form of a table. The optical overall layer thickness of the coatings 21s, 33s therefore increases from the inside out in radially symmetric fashion.

The coated surfaces 20b, 22b, 32b, 34b of the mirrors M1-M4 each have a highly reflective (HR) coating 19s, 21s, 31s, 33s that extends from the substrate 19, 21, 31, 33. Each HR coating 19s, 21s, 31s, 33s includes a plurality of thin plies. FIGS. 5A-5B shows the multi-ply structure of the respective HR coating 19s, 21s, 31s, 33s of the mirrors M1-M4 in the form of a table, with the plurality of plies being numbered starting from the substrate.

In this way, the light ray 11, 13 strikes all coated surfaces 20b, 22b, 32b, 34b. As a result of this, the phase retardation between radially and tangentially polarized light is reduced by a factor of at least two, at least for one wavelength between the maximum and minimum used wavelength of a preferably broadband used wavelength range. The layer structure of an HR coating from the prior art is likewise shown for comparison purposes.

FIG. 6 schematically shows, as a solid curve, the profile of the phase retardation of the light at the pupil edge between light polarized in the tangential direction and light polarized in the radial direction after having passed through the lens 10 of FIG. 1, as a function of the light wavelength. Over the entire wavelength range of 280 nm to 420 nm, the phase retardation has a value that varies in the vicinity of zero. For comparison purposes, the phase retardation of the light after having passed through a lens known from the prior art is shown as a dashed curve. As is evident from FIG. 6, the phase retardation in the lens 10 of FIG. 1 is significantly reduced in comparison with the lens from the prior art over the entire wavelength range.

This indicates an effective correction of the phase retardation between light polarized in the tangential direction and light polarized in the radial direction in the lens 10 according to the disclosure; this can be traced back to the configuration of the HR coatings. All four HR coatings preferably have different structures. The different structure produces phase retardations that differ in terms of sign and magnitude. These different values of the phase retardation add to a value close to zero after passing through all four HR coatings. Consequently, there is a reduction in the overall relative phase retardation after passing through the lens 10.

The reduction in the phase retardation that is independent of the wavelength and consequently achromatic, evident from FIG. 6, brings about an effective achromatization of the wavefront behavior of the HR coatings, particularly with respect to the focus component, together with the layer thickness profiles described in formula (1) and FIG. 4. This is tantamount to the correction of the longitudinal chromatic aberration produced by the HR coatings.

Figure 7:
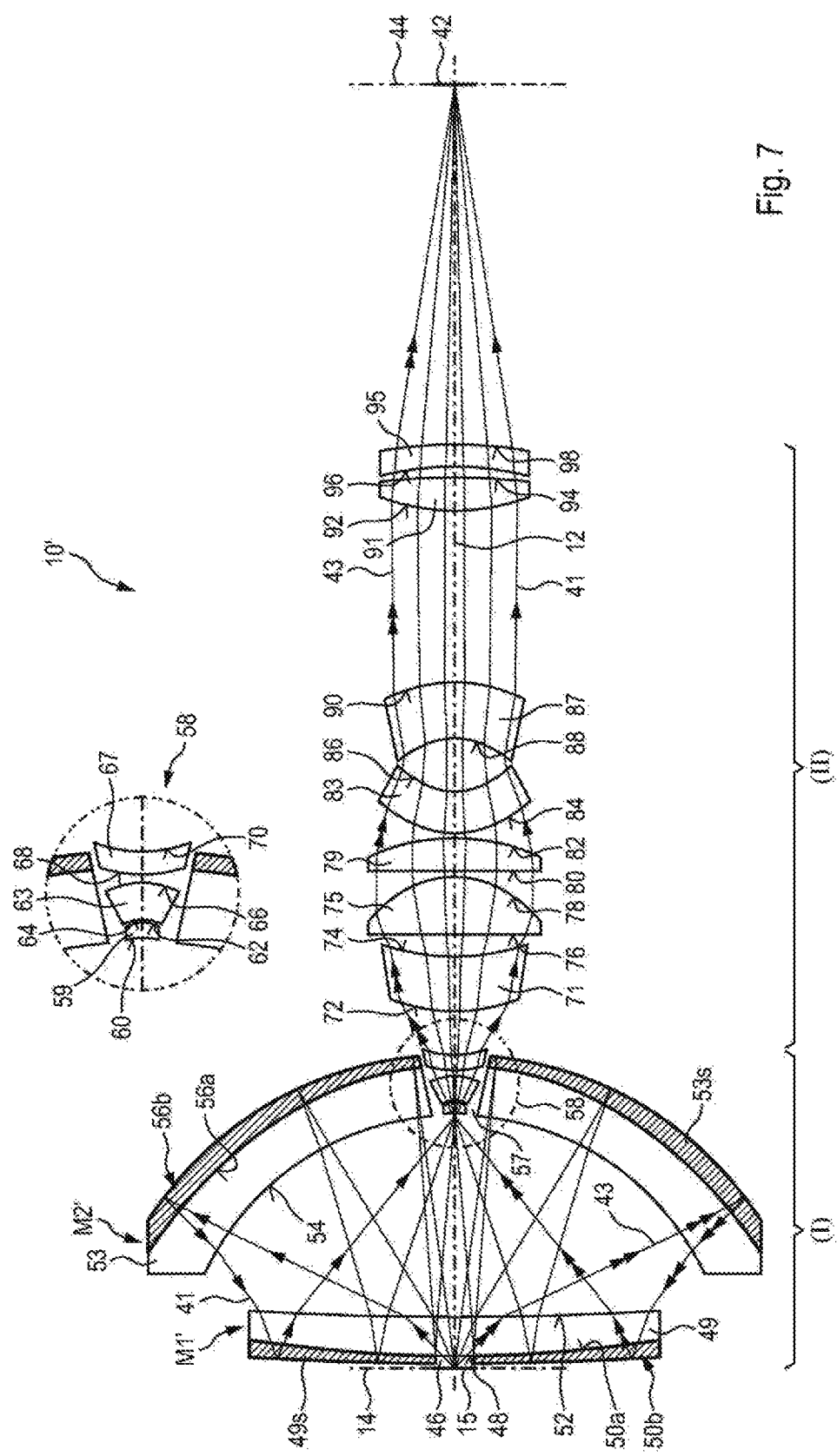
FIG. 7 shows a schematic sectional view of a further lens, which includes two Mangin mirrors.

FIG. 7 shows a schematic sectional view of a further lens 10'. The lens 10' includes a catadioptric portion I and a dioptric portion II, with both parts I, II respectively including a multiplicity of optical elements that are arranged along the optical axis 12.

The catadioptric portion I of the lens 10' is composed of two Mangin mirrors M1', M2' and a lens element arrangement 58, wherein the Mangin mirrors M1', M2' each include a surface 50b, 56b including an HR coating 49s, 53s, and a lens element 49, 53 joined to same. The HR coating 49s, 53s extends from a boundary layer 50a, 56a of the lens element 49, 53 along a surface normal in a direction away from the lens element 49, 53. At the same time, the second boundary layer 50b, 56b is the outermost reflecting surface, wherein the lens element 49, 53 serves as a substrate of the Mangin mirrors M1', M2'.

The HR coating 49s of the Mangin mirror M1' has a circular perforation 46. The Mangin mirror M2' has a perforation 57 that, with a circular cross section that tapers toward the object plane 14, extends over the entire thickness of the Mangin mirror M2'. The perforations 46, 57 have a concentric embodiment with respect to the optical axis 12.

The HR coating 49s of the Mangin mirror M1' is arranged on the boundary layer 50a of the substrate 49 and serves to reflect the light. The light passes through an end surface 52 of the substrate 49 of the Mangin mirror M1' before it is reflected at the HR coating 53s of the Mangin mirror M2'. At the Mangin mirror M2', the light will pass through an end surface 54 and the substrate 53 before it is reflected.

The respective HR coating 49s, 53s of the Mangin mirrors M1', M2' each include one or more dielectric plies. In relation to the optical axis 12, the optical overall layer thickness of the at least one dielectric ply increases from the inside out in the radial direction in this case. Preferably, the difference between the maximum and the minimum optical overall layer thickness in at least one of the two Mangin mirrors M1', M2' is more than 2% of the average value of the optical overall layer thickness. At least one of the two HR coatings 49s, 53s additionally contains one or more metallic plies. In FIG. 7, the HR coatings 49s, 53s of the Mangin mirrors M1', M2' each have a hatched depiction, wherein these are shown with a magnified layer thickness for improved visibility.

The lens element arrangement 58 is situated in the perforation 57 of the Mangin mirror M2' and shown in a magnified view. The lens element arrangement 58 includes three lens elements 59, 63, 67, which are arranged spaced apart from one another along the optical axis 12. The lens elements 59, 63, 67 extend along the optical axis 12, respectively from a first lens element surface 60, 64, 68 to a second lens element surface 62, 66, 70.

The dioptric portion II of the lens 10' includes a plurality of lens elements 71, 75, 79, 83, 87, 91, 95, which each extend along the optical axis 12 from a first lens element surface 72, 76, 80, 84, 88, 92, 96 to a second lens element surface 74, 78, 82, 86, 90, 94, 98.

A light ray 41, 43 emanating from an object 15, e.g., a wafer or a mask, situated in the object plane 14 passes through the lens element surfaces 48, 52 of the lens element 49 of the Mangin mirror M1' and reaches the Mangin mirror M2'. After passing through the lens element 53, the light ray 41, 43 is reflected at the HR coating 53s to the Mangin mirror M1'. There, the light ray 41, 43 is reflected at the HR coating 49s in the direction of the lens element arrangement 58. There, the light ray 41, 43 passes through all lens elements 59-67 and is focused on the image plane 44 by the lens elements 71-95 of the dioptric portion II.

In exemplary fashion and for the purposes of simplified pictorial representation, FIG. 7 shows that the light ray 41, 43 is reflected at an end surface of the HR coatings 49s, 53s lying opposite the boundary layer 50a, 56a.

The design data of the various optical elements of the lens 10' shown in FIG. 7 are summarized in FIG. 8 in the form of a table, in a manner analogous to FIG. 2. By way of example, the light ray 41, 43 reflected at the surface 56b passes through the interstice between the Mangin mirrors M1', M2'. The surface 56b has a radius of curvature of −63.204 mm, with the interstice having an extent of 36.000 mm in the direction of the optical axis 12. At least one of the two surfaces 50b, 56b provided with an HR coating may be embodied as an aspherical surface.

The at least one dielectric ply contained in the respective HR coating 49s, 53s of the Mangin mirrors M1', M2' has an optical overall layer thickness that, in relation to the optical axis 12, increases monotonically in radially symmetric fashion from the inside out according to the aforementioned dependency (1). FIG. 9 shows the corresponding coefficients a, b for the Mangin mirrors M1', M2' in the form of a table.

With the exception of the surfaces 49s, 53s provided with an HR coating, an anti-reflection (AR) coating is in each case on to the optical surfaces of the various optical elements of the lens 10' shown in FIG. 8. FIG. 10 shows the composition of the AR coating in the form of a table, with the plurality of plies of the respective AR coating being numbered starting from the substrate.

In this way, following the reflection at the respective surface 50b, 56b, the light ray 41, 43 passes through at least one AR coating on a further optical element of the lens 10'. As a result of this, the phase retardation between radially and tangentially polarized light is reduced by a factor of at least two, at least for one wavelength between the maximum and minimum used wavelength of a preferably broadband used wavelength range. The composition of an AR coating from the prior art is likewise shown for comparison purposes.

The HR coatings 49s, 53s of the Mangin mirrors M1', M2' extend in the direction of the lens element 49, 53 proceeding from the at least one dielectric ply. FIG. 11 shows the composition of the multi-ply HR layer in the form of a table, with the plurality of plies of the respective HR layer being numbered in the direction of incidence of the light. The HR coatings of the two Mangin mirrors M1', M2' have different embodiments. Here, the HR coating on M2' is configured in such a way that there is compensation of the phase retardation between radially and tangentially polarized light, which is caused by the reflection at the HR coating on M1' and the transmission through all further surfaces provided with AR layers. The composition of an HR coating from the prior art is likewise shown for comparison purposes. In contrast to the lens 10', the same HR coating is used in the prior art for both surfaces 50b, 56b of the two Mangin mirrors M1', M2'. Therefore, it is not possible to compensate the phase retardation in an arrangement according to the shown prior art.

Figure 12:
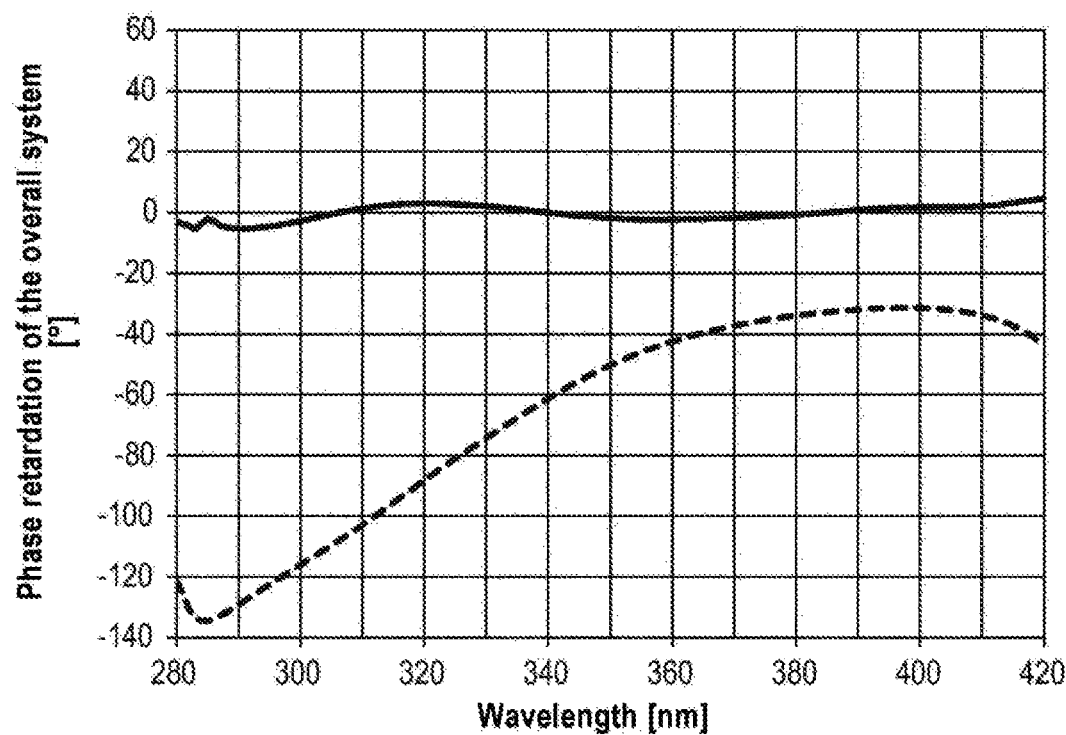
FIG. 12 shows a schematic diagram of the phase retardation of the light after passing through the lens of FIG. 7 at the pupil edge, as a function of the light wavelength.

FIG. 12 schematically shows, as a solid curve, the profile of the phase retardation of the light at the pupil edge after having passed through the lens 10' of FIG. 7, as a function of the light wavelength. Over the entire wavelength range of 280 nm to 420 nm, the phase retardation has a virtually constant value in the vicinity of zero. For comparison purposes, the phase retardation of the light after having passed through a lens known from the prior art is shown as a dashed curve. As is evident from FIG. 12, the phase retardation in the lens 10' of FIG. 7 in comparison with the lens from the prior art is significantly reduced over the entire wavelength range. This indicates an effective correction of the phase retardation between radially polarized light and tangentially polarized light via the lens 10', which can be traced back to an effective compensation of the phase splitting by the two HR coatings and the AR coatings, in a manner analogous to the lens 10 in FIG. 1.

It is generally known from Ross et al. Appl. Opt. V48, p 1812 (2008) that the following quasi-equation (2) applies to the Strehl ratio, which specifies the imaging quality of a lens:

$$S(\sigma) \approx 1 - (2\pi\sigma)^2 \qquad (2)$$

where σ is defined as $\sigma = \overline{P^2} - (\overline{P})^2$ and P is the absolute value of the phase shift.

Here, the imaging quality of the system, for example of a lens, is measured using the ratio of the observed maximum intensity of a point source in the image plane to the theoretical maximum intensity of a perfect, or at least diffraction-limited, optical system. The Strehl ratio approaches the value of 1 with increasing imaging quality. This can be achieved by an effective correction of optical aberrations.

In the pupil plane of a lens, the absolute value of the phase retardation P can have a quadratic dependence on the pupil coordinate r according to (3):

$$p \sim r^2 \qquad (3)$$

If the above definition for σ adopts the quadratic profile of the phase retardation specified in (3), the Strehl ratio S of (2) can be specified in the Maréchal approximation. From this, the Strehl ratio for the phase retardation of the light after passing through the overall system emerges according to $$S(\sigma) \approx 1 - 4\pi^2 \left(\frac{P}{360}\right)^2 \frac{1}{12} \qquad (4)$$

Figure 13:
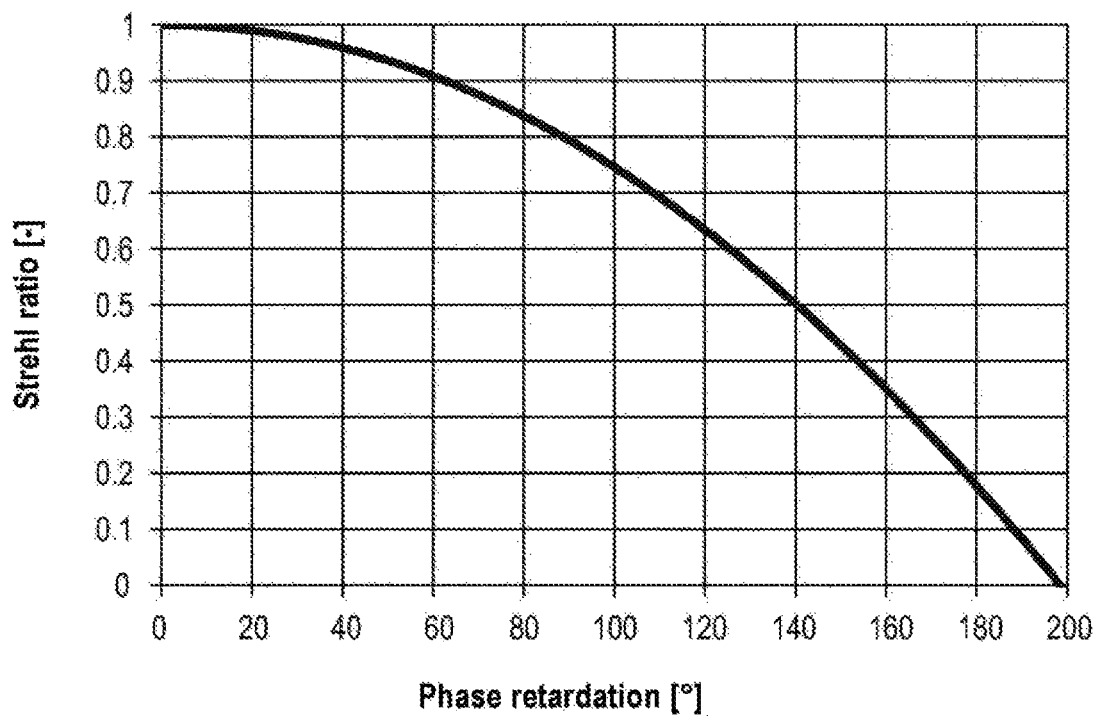
FIG. 13 shows a schematic diagram of the Strehl ratio as a function of the phase retardation for the lenses of FIG. 1 and FIG. 7.

The phase retardation P adopts the unit of degrees, with the Strehl ratio being a dimensionless variable. FIG. 13 shows a diagram in which the Strehl ratio ascertained according to (4) is plotted as a function of the phase retardation.

As is evident from FIG. 13, a Strehl ratio of 63% emerges for a phase retardation of 120° from equation (4). This corresponds to a deterioration in the imaging properties, in which imaging aberrations by superposition of point images formed by the light polarized in the tangential direction and point images formed by the light polarized in the radial direction. These point images are defocused in relation to one another. The superposition leads to a smearing of the point image and hence to the aforementioned reduction in the Strehl ratio. By way of example, this is the case in the lenses from the prior art. The phase retardation can be reduced by a factor of at least two with the aid of the lens 10, 10' according to the disclosure. Proceeding from an original phase retardation of 120°, the latter can consequently be reduced to no more than 60°, with the Strehl ratio being at least 85% and consequently representing a significant improvement in the imaging properties.

The lens 10, 10' can be used for a used wavelength range whose minimum is at least 400 nm, preferably 300 nm, further preferably 200 nm. Here, the maximum wavelength can be at least 1.1-times the minimum wavelength. As an alternative or in addition thereto, the lens 10, 10' may have a numerical aperture (NA) of at least 0.75.

An object 15 to be inspected, for example a wafer or a mask arranged in the object plane 14, can be imaged onto the image plane with the aid of the lens 10, 10'. A detection unit, for example a CCD camera, can be used to capture the image of the object 15 arising in the process. As a result of this, information relating to the surface profile of the object is accessible for the purposes of correcting surface defects as desired.

By way of example, the lens 10, 10' can be used in a microscope and/or a wafer or mask inspection apparatus, for instance during semiconductor or component manufacturing, in order to examine the surface condition of the wafer. Alternatively, the lens 10, 10' can be used in an optical system, for example of a projection exposure apparatus for the exposure of light-sensitive resists in semiconductor manufacturing or for photolithographic imaging of mask structures on a wafer. For microelectronics and nanoelectronics, it is very important for the wafer to be processed to have as few surface defects as possible in order to ensure high performance of the electronic components produced therewith.

What is claimed is:

1. A catadioptric lens having an optical axis, the catadioptric lens comprising:
   a first mirror comprising a first substrate and a first reflective coating on a first boundary layer of the first substrate, the first reflective coating extending from the first boundary layer along a first surface normal; and
   a second mirror comprising a second substrate and a second reflective coating on a second boundary layer of the second substrate, the second reflective coating extending from the second boundary layer along a second surface normal,
   wherein:
      the first and second mirrors are arranged along the optical axis;
      the first reflective coating comprises one or more first plies;
      an optical overall layer thickness of the one or more first plies increases along a radial direction extending outwardly from the optical axis;
      the
      the catadioptric lens is configured so that, for a used wavelength range of light of the catadioptric lens, after the light reflects from a reflective coating of an optical element of the catadioptric lens, the catadioptric lens reduces by a factor of at least two a phase retardation between radially and tangentially polarized light by:
         i) reflection of the light at at least one coating selected from the group consisting of the first reflective coating and the second reflective coating; or
         ii) transmission of the light through an anti-reflection coating of a mirror selected from the group consisting the first mirror and the second mirror;
      the used wavelength range of light has a minimum wavelength of light and a maximum wavelength of light; and
      the maximum wavelength of light is at least 1.1 times the minimum wavelength of light.

2. The catadioptric lens of claim 1, wherein:
   the second reflective coating comprises one or more second plies; and
   an optical overall layer thickness of the one or more second plies increases along the radial direction extending outwardly from the optical axis.

3. The catadioptric lens of claim 1, wherein a difference between a maximum of the optical overall layer thickness of the one or more first plies and a minimum of the optical overall layer thickness of the one or more first plies is more than 2% of an average of the optical overall layer thickness of the one or more first plies.

4. The catadioptric lens of claim 1, wherein, relative to the optical axis, the optical overall layer thickness of the one or more first plies has a radially symmetric profile.

5. The catadioptric lens of claim 1, wherein, relative to the optical axis, the optical overall layer thickness of the one or more first plies increases monotonically along the radial direction extending outwardly from the optical axis.

6. The catadioptric lens of claim 1, wherein the catadioptric lens is configured for a used wavelength range of less than 400 nm.

7. The catadioptric lens of claim 1, further comprising at least one element selected from the group consisting of a Mangin mirror and a lens element.

8. The catadioptric lens of claim 1, wherein at least one mirror selected from the group consisting of the first mirror and the second mirror has an opening configured to pass light during use of the catadioptric lens.

9. The catadioptric lens of claim 1, wherein at least one coating selected from the group consisting of the first reflective coating and the second reflective coating comprises a dielectric material and/or a metal.

10. The catadioptric lens of claim 1, further comprising a beam splitter which comprises a transparent plate with a plane boundary layer.

11. The catadioptric lens of claim 1, further comprising at least one member selected from the group consisting of the first mirror and the second mirror comprises an aspherized mirror surface.

12. The catadioptric lens of claim 1, wherein the catadioptric lens has a numerical aperture greater than 0.75.

13. The catadioptric lens of claim 1, wherein the catadioptric lens has a Strehl ratio greater than 85%.

14. The catadioptric lens system of claim 1, wherein the catadioptric lens is a projection lens.

15. An optical system, comprising:
    a catadioptric lens according to claim 1,
    wherein the optical system is a mask inspection system.

16. An optical system, comprising:
    a catadioptric lens according to claim 1,
    wherein the optical system is a wafer inspection system.

17. An optical system, comprising:
    a catadioptric lens according to claim 1,
    wherein the optical system is a photolithographic imaging system.

18. The catadioptric lens of claim 1, wherein at least one member selected from the group consisting of the first mirror and the second mirror comprises an anti-reflection coating.

19. The catadioptric lens of claim 1, wherein the optical overall layer thickness of the one or more first plies depends on a power selected from the group consisting of a quadratic power of a radial distance relative from the optical axis and a fourth power of a radial distance from the optical axis.

20. The catadioptric lens of claim 19, wherein the optical overall layer thickness of the one or more first plies depends linearly on a sum of the quadratic power of the radial distance relative from the optical axis and the fourth power of the radial distance from the optical axis.

* * * * *

UNITED STATES PATENT AND TRADEMARK OFFICE
CERTIFICATE OF CORRECTION

PATENT NO. : 11,561,381 B2
APPLICATION NO. : 16/544135
DATED : January 24, 2023
INVENTOR(S) : Konstantin Forcht and Dirk Doering It is certified that error appears in the above-identified patent and that said Letters Patent is hereby corrected as shown below:

On the Title Page

Column 1, Other Publications, Line 3, delete "Library ," insert -- Library, --.

In the Specification

Column 7, Line 6, delete "FIG." insert -- FIGS. --.

In the Claims

Column 13, Line 24, Claim 1, delete "the".

Column 13, Line 37-38, Claim 1, delete "the group consisting the" insert -- the group consisting of the --.

Column 14, Line 30, Claim 14, after "catadioptric lens" delete "system".

Signed and Sealed this
Twenty-first Day of March, 2023

*Katherine Kelly Vidal*

Katherine Kelly Vidal
*Director of the United States Patent and Trademark Office*